Sept. 15, 1953 A. B. SNYDER 2,651,810
APPARATUS AND METHOD FOR MOLDING BRUSHES
Filed July 10, 1952
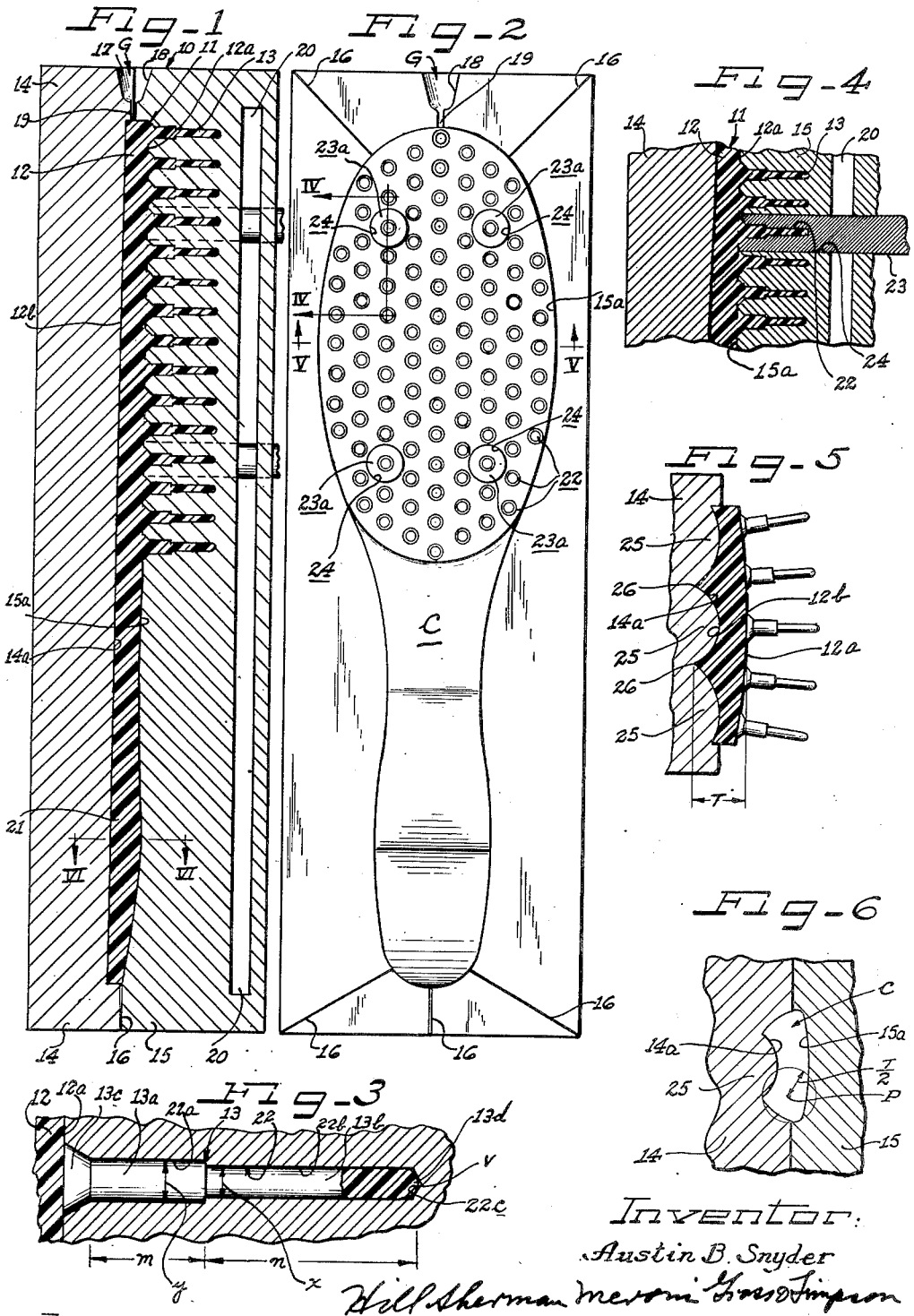
Inventor:
Austin B. Snyder
by Hill, Sherman, Meroni, Gross & Simpson
Attys Patented Sept. 15, 1953

2,651,810

UNITED STATES PATENT OFFICE 2,651,810

APPARATUS AND METHOD FOR MOLDING BRUSHES

Austin B. Snyder, Toledo, Ohio, assignor to Owens Brush Company, Toledo, Ohio, a corporation of Ohio Application July 10, 1952, Serial No. 298,074

28 Claims. (Cl. 18—42)

My invention relates to an improved method of and apparatus for forming a plastic article, and the article product resulting from the use of my method and/or apparatus, and more particularly to an improved method of and apparatus for forming an integral plastic article, such as a brush, having a body and a plurality of spaced slender round-tipped fingers or bristles extending from a face thereof, and to such brush-like article.

In the injection molding of a plastic article, relatively movable mold elements are first assembled in closed engaged position so as to define the desired mold cavity, and plasticated or liquified organic plastic material is injected into the mold cavity via a suitable gate. The material is then retained in the mold until it has rigidified sufficiently to set in the form desired in the mold cavity, and the mold is then opened and the article rigidified therein is removed. As will be appreciated, a certain amount of time is consumed in injecting the plasticated material into the mold cavity, another amount of time is consumed in retaining the material in the mold cavity until sufficient rigidification has taken place, and still another amount of time is consumed in the completion of the cycle by opening the mold, removing the rigidified article and again closing the mold, in preparation for receiving the next injection of plasticated material.

One of the most important problems faced by the workers in the molding art is that of reducing the total amount of time consumed in completing each molding cycle. Another important problem is that of minimizing the number and extent of the steps necessary to completely finish the molded article, after the molding cycle has been completed, so as to put the article in condition for commercial use.

In the fabrication of plastic brushes or the like articles, which have a body and a plurality of spaced slender finger-like bristles extending from a face thereof, relatively complicated molding problems are involved. The instant invention is uniquely adapted, however, to greatly simplify and speed up molding operations involving this type of fabrication.

The instant invention is based upon the discovery of several advantageous operational and structural features which, alone or in combination, effect an appreciable improvement over the methods and apparatus heretofore used by those skilled in the art. Each of such features, alone or in combination with any other one or more of such features, may be employed in accordance with my invention to bring about noticeably advantageous results in the fabrication of plastic articles, and in particular, in the fabrication by molding of plastic brushes and the like articles.

These features include the entrapment of air in each of the bristle-forming holes or cavities during molding so as to have a very high air pressure exerted against the bristle tip in the mold, thereby affording a force to assist in the freeing of the rigidified bristle from the mold and also affording a uniform fluid pressure at the bristle tip during rigidification so as to effect formation of finished smooth rounded ends on each bristle.

A further feature of my invention includes the provision of bristle-forming cavities so shaped with respect to their diameters and/or cross-sectional areas and their depths that the optimum conditions for the entrapment of air may be brought about. Also, the bristle-forming cavities are prefedably designed to have a substantially telescopic shape, as contrasted to a straight taper, in order to facilitate the freeing of each such bristle from the bristle-forming cavity.

Another feature of my invention includes the special cooling of the mold element mounting the bristle-forming cavities so as to accelerate the rigidification of plastic in such cavities, to counteract any delay in rigidification which might be occasioned by heat generated through the compression of the entrapped air, to obtain maximum shrinkage (resulting from the rigidification of such plastics as polyethylene) in the bristle cavities to facilitate freeing the bristles therefrom, and to obtain maximum rigidification at the bristle-bearing face of the article to shorten the retention time necessary for effective knockout pin action in the molding cycle.

Still another feature involves the cooling of the article in the mold at the surface to be used for cooperating with the knockout pins, by means of the aforementioned special cooling, to a predetermined temperature suitable for knockout pin action, and then removing the article from the mold by knockout pin action and quenching the article to complete the cooling outside of the mold and to prevent internal heat from reheating the surface of the article during such cooling outside of the mold. Also, I have found it unusually advantageous to employ knockout pins presenting a substantial portion of the mold cavity face, so that they may coact with a substantial area of the freshly rigidified article in the mold. Preferably, such knockout pins contain a bristle-forming cavity, so that they may coact with a substantial portion of the article face surrounding a bristle, during knockout pin action. By using such features of method and apparatus, the maximum effectiveness of the compressed entrapped air, in resiliently urging the rigified bristles out of their respective cavities, may be obtained since the maximum effective temperature of the compressed air is employed.

Yet another operational feature involves the employment of molding temperatures to provide, in cooperation with the cooled mold walls, adequate fluidity under pressure and yet good surface formation of the plastic, free from air pockets and the like. Also, the use of pressure adequate to reduce the entrapped air to a negligible volume is an important feature, so that the fluid plastic will substantially fill the bristle-forming cavities.

Yet a further feature of my invention involves the positioning of ribs in the mold cavity so that the cooling of the body of the brush or the like article may be synchronized with the cooling and rigidification of the bristle members. In this manner, a body of substantial strength, because of the particular structural arrangement employed, may be obtained in a rapid molding cycle, at a substantial saving of molding materials.

It is, therefore, an important object of my invention to provide an improved method of and apparatus for the fabrication of complicated plastic moldings, such as brushes or the like articles, and to provide an improved brush structure by the use of such method and/or apparatus.

Another object of my invention is to provide an improved method of forming an article having a round-tipped slender finger thereon using a suitable mold with a finger cavity for forming the article finger which comprises the steps of forcing liquid organic plastic material into the mold to entrap air in the finger cavity, subjecting the liquid material to high pressure to compress the entrapped air to a minute volume surrounding the article finger tip, and rigidifying in situ the material in the mold.

A further object of my invention is to provide an improved method of forming a rounded end upon a slender rod-like polyethylene body, that comprises injecting polyethyene material at 450–550° F. and under 300–500 atmospheres into a closed mold cavity of substantially uniform diameter not in excess of 0.08 inch and having a depth of at least ¼ inch to entrap air in the cavity, and rigidifying in situ the material in the mold.

Yet another object of my invention is to provide an improved method of forming an article having a round-tipped slender finger thereon, which comprises filling a suitable mold having a closed finger cavity with plasticated polyethylene material at 300–550° F. and under 300–1000 atmospheres to entrap air in the cavity, simultaneously cooling the mold to 60–70° F. to accelerate rigidification and material shrinkage in the mold, and, as soon as the material surface has cooled to 120–140° F., ejecting the material from the mold and exposing the ejected material to a cooling medium to prevent heat from within the material from increasing the surface temperatures thereof during cooling of the material to room temperature.

Yet a further object of my invention is to provide an improved injection molding assembly for molding an integral plastic article having a body and a plurality of spaced slender round-tipped fingers extending from a face thereof, which comprises a plurality of relatively movable mold elements adapted to open and close and to define in closed position a suitable mold cavity for the article, one of such elements having unvented finger-forming holes on the cavity face thereof, and said elements defining air bleed vents at contiguous faces thereof in closed position in communication with said mold cavity.

Still another object of my invention is to provide an improved injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof and having a second cavity therein separate from the mold cavity to accommodate fluid cooling media, means communicating with said second cavity for providing fluid cooling media, a plurality of spaced axially movable sleeve-like knockout pins mounted in said one element, each surrounding one of said finger-forming holes on the cavity face of said one element, means for moving said pins axially relative to said one element, and ribs positioned on the cavity face of the other of said elements projecting into the body-forming cavity space so that every point in such space is spaced from at least two separate points on the cavity faces a distance less than one-half the maximum body thickness.

Still a further object of my invention is to provide an improved injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof each having a mouth portion of substantially uniform diameter of 0.06–0.1 inch and a depth of at least ⅛ inch and having a narrower inner portion closed at its inner end having a substantially uniform diameter of 0.08–0.04 inch and a depth of at least ¼ inch.

Another important object of my invention is to provide an integral polyethylene brush having a body and a plurality of spaced slender finger-like bristles extending from a substantially flat front face of the body, said body having a back face in substantially parallel alignment with the front face, the back face having grooves therein arranged so that every point within the brush body is spaced from at least two separate points on the brush body surface a distance less than one-half the maximum body thickness between said faces.

Other objects, features and advantages of my invention will become apparent to those skilled in the art from the following disclosure and drawings relating to a preferred embodiment of my invention.

On the drawings:

Figure 1 is a sectional elevational view of a mold assembly embodying my invention, showing a rigidified brush embodying my invention positioned in the mold cavity;

Figure 2 is a top plan view of a mold element embodying my invention, having bristle-forming cavities therein;

Figure 3 is an enlarged sectional detail view showing a bristle suitably positioned in a bristle-forming cavity of the mold;

Figure 4 is an enlarged sectional detail, taken substantially at the location IV—IV, indicated on Figure 2, showing the cooperation between the knockout pin and the remainder of the mold assembly, with the brush positioned therein;

Figure 5 is a sectional elevational view of a brush embodying the instant invention, the section being taken substantially at the position indicated by the line V—V in Figure 2; and Figure 6 is essentially a diagrammatical view showing the relationships between the rib design of the mold cavity and the resulting article shape.

As shown on the drawings:

In Figure 1, the reference numeral 10 indicates generally an injection molding assembly for molding an integral plastic article, designated generally by the reference numeral 11, in position in the assembly 10 and having a body 12 and a plurality of spaced slender round-tipped fingers or bristle members 13 extending from a face 12a of the body.

The injection molding assembly 10 comprises a plurality of relatively movable mold elements adapted to open and close and to define in closed position a suitable mold cavity for the brush or the like article 11. As here shown, the assembly 10 comprises a pair of matingly engageable mold elements, including a first element 14 adapted to be retained in fixed position and a second element 15 adapted to be moved relative to the fixed element 14, for opening and closing the assembly 10.

As shown in Figure 2, the movable element 15 has a plurality of extremely shallow grooves 16, which extend from the mold cavity C outwardly to the edges of the mold element 15. When the mold elements 14 and 15 are in closed position the grooves 16 define restricted air-bleed vents for the mold assembly 10, which prevents the entrapment of air at the opposite ends, longitudinally, of the cavity C when the same is filled with plasticated molding material. Also, gate grooves 17 and 18 in contiguous face portions of the mold elements 14 and 15, respectively, cooperate to define a gate or material inlet passageway G through which material may be urged, in fluidized state, into the cavity C. It will be noted that the gate G has a very short restricted portion 19 just at the entrance of the gate G into the cavity C. The restricted gate portion 19 makes possible the formation of a body of minimum cross-sectional area which must be clipped or cut in the finishing of the brush 11 subsequent to the molding operation. The very shallow grooves 16, of course, serve not only to provide for the formation of excess material of minimum cross-sectional area, which must be trimmed from the molded brush, but also provide such extremely shallow or restricted vents that the molding material, in driving the air from the cavity C at the opposite ends thereof, sets up rapidly as it enters the grooves 16 so as to effectively form a plug for such grooves 16, so that the required operating molding pressure may be maintained in the body of the fluidized or plasticated plastic material within the cavity C, during the normal molding operation. As will be explained in detail hereinafter, the cooling of the mold element 15, also facilitates the setting up or plugging of the material as soon as it enters the groove 16, thereby effectively minimizing the amount of trimming operation necessary subsequent to the molding operation.

The mold elements 14 and 15 are, of course, made of suitable material for their intended use, such as suitably polished steel or the like metal, which is also a good heat conductor. Also, the movable mold element 15 is provided with cooling means in the die frame (not shown), or preferably in a second closed chamber or cavity 20 (which is generally of a proportionally greater size than that indicated in Figures 1 to 4) which is adapted to accommodate fluid cooling media, such as water or the like liquid. Means (not shown) may, of course, be provided for flowing the cooling fluid through the cavity 20 so as to accomplish the necessary amount of cooling, which will be described in detail hereinafter. In general, I have found that suitable hose connections (not shown) may be employed for flowing, for example, tap water through the cavity 20 and out a suitable drain, at a predetermined rate of flow so as to maintain the mold element 15 at a predetermined temperature.

The elements 14 and 15 are matingly engageable to define the cavity C for the brush body 12 and the bristles 13, and as here shown, a suitable integral body-handle 21. As will be appreciated, the handle 21 might be omitted, if desired, in the fabrication of a brush of the type here involved. The movable mold element 15 is provided on its cavity face 15a with a plurality of uniformly spaced bristle or finger-forming cavities or holes 22 for molding each of the bristles 13 on the oval, face portion 12a, which is substantially flat, but may be even more bowed than here shown.

Referring to Figure 3, it will be seen that each such bristle-forming hole 22 has preferably a generally telescopic shape for defining or molding the bristle 13, having an enlarged portion 13a near the mouth of the hole 22 and a smaller more slender portion 13b coaxially extending farther into the hole 22. Although the portions 13a and 13b here shown appear to each have uniform cross-sections or diameters, in actual practice it is preferable to drill the corresponding sections of the hole 22 with a very slight taper (to facilitate the drilling operation, as well as the subsequent removal of rigidified bristles therefrom). These bristles sections 13a and 13b (and the corresponding sections of the hole 22) have substantially uniform cross-sections or diameters, in that the overall taper of the bristle 13 is accomplished by means of a "stepped" or telescopic bristle design, as contrasted to an overall taper the full length of the bristle. More than two "steps" may be used.

It will, of course, be appreciated that the instant invention may be employed in the manufacture of brushes having a substantially straight taper the full length of each of the bristles thereon (preferably employing bristle cavity dimensions within the scope of those hereinafter indicated as preferred dimensions), but I found that the instant stepped or telescopic bristle arrangement is superior in several respects, including the function of entrapping air in the hole 22 during molding and the facilitation of removal of the bristle 13 from the hole 22, after rigidification.

As shown in Figure 3, each of the bristles 13 has a flared, frusto-conical root or base portion 13c, which is employed for the purpose of furnishing additional support at the base of the bristle 13. As will be appreciated, this is an additional design feature, involving only a very small section of the bristle 13 (and the bristle cavity 22), and the various proportions and dimensions hereinafter set forth in connection with the telescopic shape of the tendril 13 exclude from their scope the instant root portion 13c, treating the same as if it were a part of the face 12a of the body 12. In other words, I have found it preferable to use a bristle-forming cavity 22 having a mouth portion 22a of substantially uniform diameter of 0.06-0.1 inch (indicated as $y$ in Figure 3) and a depth $m$ of at least 1/8 inch; and having a narrower inner portion 22b closed at its inner end 22c and having a substantially uniform diameter $x$ of 0.04-0.08 inch and a depth $n$ of at least 1/4 inch. In particular, I prefer to employ bristle cavities 22 each having a terminal portion 22b of substantially uniform diameter $x$ not in excess of 0.08 inch and having a depth $n$ of at least about 1/4 inch and not more than about 3/4 inch, preferably being about 1/2 inch. The mouth portion 22a of the hole 22 may have a depth $m$ of about 1/8-3/8 inch, preferably about 1/4 inch.

I have found that, under the preferred operating conditions for the instant invention, bristle-forming cavities 22 of substantially the dimensions hereinbefore disclosed are unusually effective in accomplishing the necessary entrapment of air therein, so as to obtain the advantageous results of the instant invention. Although entrapment of air may be accomplished in certain instances employing larger cavity sizes, I have found that in general the cross-sectional area of a cavity suitable for the instant purposes should not be more than 0.02 square inch and should have a depth of at least about 1/4 inch. The preferred dimensions of such cavity 22 are set forth hereinbefore.

In the instant method, I carry out the steps of forcing liquid organic plastic material into the mold assembly 10, through the gate G and into the bristle-forming cavity or hole 22 so as to entrap air in this cavity 22, subjecting the liquid material to high pressure to compress the entrapped air in the cavity 22 to a minute volume V at the closed end 22c of the cavity 22 and surrounding the bristle tip 13d, and then rigidifying in situ the material in the mold 10. By filling the mold with such liquid organic plastic material under high pressure to entrap air in the "finger" or bristle cavity and compressing the air therein under such pressure, I am able to substantially fill the cavity 22, leaving only a very insignificant total volume V of air at the closed end 22c of the cavity 22. However, that volume V of air exerts a very great pressure against the surface of the bristle tip 13d so as to effectively round the tip 13d, or form it in substantially the shape of a hemisphere in response to the pressure of the compressed air. In this manner, I am able to form precisely the desired round tipped shape of the molded bristle that is desired in the finished brush. Ordinarily, in the molding of intricate or complicated surfaces on articles, it has been the practice to provide mold cavity faces conforming precisely to the desired contour of the article and to provide suitable vents at the high spots or "blind hole" regions wherein air might be entrapped. If I were to use such a procedure in the molding of bristles such as the bristles 13, I would be confronted with the very difficult problem of providing bleed lines at the bottoms 22c of the cavities 22 so that a minimum amount of material would escape through the bleed lines during molding and I would further be confronted with the subsequent finishing step, after molding, of removing or trimming that minimum amount of material which passed into the vent lines during molding. It will thus be seen that by the use of a cavity bottom 22c, which is not required to even have the shape desired for the bristle tip 13d (being that of an inverted cone formed by the point of a drill bit as shown in Figure 3) I am able to avoid many complications of operation control and also to obtain a completely finished bristle tip 13d in the molding step, without additional finishing operations. The importance of avoiding subsequent finishing steps in connection with the use of such plastics as polyethylene is additionally significant in view of the fact that polyethylene may not be cut or machined without obtaining a roughened surface in normal operations of this type. In fact, this is the principal reason why I employ the restricted opening 19 for the gate G in my mold assembly 10, so that I may have only the smallest possible roughened spot on the resulting brush 11.

In general then, I employ operating conditions in conjunction with a cavity design such that the minute volume V of air entrapped in the bottom of each of the cavities 22 is substantially coextensive with the bottom 22c, so as to effectively impart or exert air pressure against the entire bristle tip 13d.

Although I may use in my invention any organic plastic or synthetic resin material which may be liquified or plasticated in an ordinary molding process and may be forced in such condition into a suitable mold cavity and rigidified therein, I prefer to use those thermosetting and thermoplastic synthetic resins which are ordinarily employed in injection molding operations, and most preferably the thermoplastic synthetic resins of this class. Such thermoplastic materials include polystyrene, the cellulose esters and ethers, polymethylmethacrylate and the like polyacrylates, and the ethylene polymers. The ethylene polymers, which I prefer to use herein, include such polyvinyl esters as polyvinyl acetate and such halo-substituted ethylenes as polyvinylchloride, polyvinylidene chloride, polymonochlorotrifluoro ethylene and polytetrafluoroethylene, as well as the unsubstituted polyethylene. Most preferably, I employ polyethylene because of its unusual suitability to the instant invention with respect to entrapment of air, shrinkage, and the like properties.

First of all, I plasticate or fluidize the particular plastic material, which I employ, by any of the ordinary methods employed in plasticating suitable plastic molding materials for use in injection molding. In general, plastication of such materials involves the application thereto of a substantial amount of heat and/or pressure, by one method or another.

The particular temperature to which I heat the plastic material during the plastication of the same depends, of course, upon the particular melting or softening point of that material. In the case of polyethylene, I find that the preferred temperature is about 300-550° F. and the most preferred operating temperature is about 450-550° F. for the purposes of the instant invention. Employing the preferred operating conditions disclosed for the instant invention, I find that about 500° F. gives the best results.

In order to effectively entrap and compress air in the cavities 22, I find that I must employ at least about 300 atmospheres pressure on the plasticated material in the mold cavity. Ordinarily, it is not necessary to employ pressures in excess of 1000 atmospheres, and I have found that about 300–500 atmospheres is preferred, with 400 atmospheres pressure being the most preferred operating pressure for use in my invention.

Under the aforementioned conditions of temperature and pressure, I inject the plasticated polyethylene into the mold cavity C, while simultaneously cooling the mold assembly 10 to accelerate rigidification in situ of the polyethylene and shrinkage thereof in the mold 10. In general, I find that cooling of the movable mold element 15, by the application of a fluid cooling medium thereto, for example, in the second cavity 20, affords sufficient cooling of the mold assembly 10 to accomplish the desired result. Actually, of course, air cooling of the fixed mold element 14 will take place continuously during operation to hold it at about 100–120° F. by the application of a suitable fluid cooling medium, such as cooling water to the mold element 15. I preferably maintain that mold element at below 75° F. during operation, and most preferably I maintain a temperature of about 60–70° F. at all times in the molding element 15. I have found that this special cooling operation in connection with the movable mold element 15 results in an unusually accelerated molding cycle, and appears to effect the most favorable operating conditions for the entrapment of air in the bristle cavities 22 and for the subsequent removal of the rigidified brush 11 from the mold assembly 10.

I find that most preferably the polyethylene material is retained in the mold cavity C until the surface temperature of the brush 11 has cooled to at least about 130° F., or until the surface has cooled to a temperature within the range of about 120–140° F. I have found that by employing proper operating conditions and a subsequent quenching step, to be described, that it is not necessary to retain the polyethylene brush 11 in the mold assembly 10 for cooling the surfaces of the same to temperatures below about 120–140° F., and that a substantially shortened molding cycle may be employed under the conditions of my invention, if I effectively eject the polyethylene brush 11 from the mold assembly 10 after the surfaces of the brush 11 have cooled to the extent just described. It will be appreciated that in the molding of articles of radically different sizes and/or shapes from the approximately 2 ounce brush 11 herein described, somewhat different surface temperatures may have to be employed. I find that in the particular operation here described, using the various features of mold design to effectively cool and rigidify the polyethylene, as well as to eject the polyethylene brush 11 from the mold assembly 10, cooling of the polyethylene surface to about 120–140° F. effects a sufficient rigidity and permanency of shape to the molded article, so as to permit ejection from the instant mold assembly, by means of the knockout pins, which I shall now describe.

Referring to Figure 4, it will be seen that the knockout pin 23 is one of four uniformly spaced knockout pins 23, which is an axially movable sleeve-like member mounted for sliding engagement in suitably formed cylindrical apertures 24 in the movable mold element 15. It will also be seen that each of such knockout pins 23 extends surroundingly of a bristle-forming cavity 22, and presents a cavity face 23a which is flush with the cavity face 15a of the movable element 15.

During the molding cycle, after the material has been retained in the mold for the time required to effect the necessary rigidification the movable member 15 is moved away from the fixed mold element 14, and the polyethylene brush 11 adheres to the cavity face 15a of the movable member 15 and separates from the cavity face 14a of the fixed element 14. After the mold elements 14 and 15 have been separated a short distance, the knockout pins 23 are caused to move forward (by means not shown) in the direction of the fixed element 14, and in so doing the knockout pins 23 effectively separate the brush 11 from the cavity face 15a of the movable element 15, by forcing each of the rigidified bristles 13 out of their respective bristle-forming cavities 22, with the exception of the cavities contained in each of such knockout pins 23. The forces tending to retain the bristles 13 in each of the cavities 22 in the knockout pins 23 are so small that the brush may be easily removed from the knockout pins, for example, manually or by any other of the ordinary type of knockout devices.

A particularly advantageous feature of the instant knockout pins 23 resides in the fact that such pins present faces 23a which are capable of exerting localized knockout pressure at substantially large areas on the face 12a of the brush body 12. The advantages of this arrangement, as contrasted to what might be called a normal knockout pin arrangement whereby a generally round flat-faced knockout pin positioned in between the bristles 13 is used, include the remarkable reduction in the retention time necessary in the mold of approximately one-half that which would be required using the so-called normal knockout pin arrangements. Moreover, the instant knockout pins 23 exert knockout pressure surroundingly of the base of a specific bristle 13, in each case, so that there is no tendency to so deform the face 12a at a point adjacent one side of that bristle 13, for example, to cause that particular bristle 13 to be tilted or out of line.

In order to obtain full advantage of the greatly accelerated molding cycle which I may employ using my knockout pin arrangement, in conjunction with the entrapment of air and the mold cooling operation hereinbefore described, I find that the instant brush 11 should be immersed in a suitable cooling medium, such as water at a temperature of not more than 100° F., and preferably about room temperature, to prevent the heat from within the brush from increasing the surface temperatures thereof, in the thick sections in particular, during cooling of the material after it has been removed from the mold. In the case of relatively thick sections of the material, I have found that it is quite important that this so-called "quenching operation" be employed so that the surfaces of the polyethylene brush adjacent the thick portions thereof will not become roughened and blistered, which is the result if the polyethylene brushes are permitted to cool in air, after they have been removed from the mold during the preferred accelerated molding cycle which I employ (i. e., ejecting the brush from the mold as soon as its surface has cooled to 120–140° F.).

As will be appreciated, plastic materials such as polyethylene have a certain amount of inherent resilience or elasticity, and in order to obtain a polyethylene article which, at room temperatures, has the necessary strength and rigidity of, for example, the back and/or handle of a brush such as the brush 11 here described, it is necessary to employ substantial thicknesses of the polyethylene. On the other hand, the use of a substantially thick piece of polyethylene requires additional time for cooling and/or additional care in quenching the article when removing the same from the mold during a high speed molding cycle. I have found that I may so shape the cavity face 14a of the fixed element 14 that the back face 12b of the body 12 which is in substantially parallel alignment with the front or bristle bearing face 12a, may be suitably shaped so as to avoid many of the above mentioned difficulties.

As shown in Figure 5, I may provide a plurality of convex longitudinally extending ribs 25 on the cavity face 14a of the mold element 14, so as to effect formation of rounded, convex grooves which extend longitudinally of the brush 12 the full length thereof, including the handle 21. It will be appreciated that the two outside grooves 25, 25 extend only the length of the back face 12b corresponding to the oval front face 12a, whereas the central groove 25 extends the full length of the brush, providing a central groove for the top face of the handle 21.

By the instant arrangement, the longitudinally extending ribs 26 on the back of the brush body 12 are of sufficient height to impart strength and rigidity to the brush, but the concave grooves between the ribs 26 impart a shape to the body 12 such that every point within the brush body 12 is spaced from at least two separate points on the brush body surface a distance less than one-half the maximum body thickness between the faces, which is the distance $t$ from the bristle-bearing face 12a to the top of the rib 26, as shown in Figure 5. Expressed in other terms, the total distance between any given point in the brush body 12 and the three nearest separate points on the brush body surface is less than 1½ times the maximum body thickness between the faces, and most preferably is less than the maximum body thickness alone, the average of such distances thereby being about ⅓ of the maximum body thickness.

Referring to Figure 6, it will be seen that the central rib 25 is adapted to impart a convex groove to the top of the brush handle 21. It will also be seen that by the selection of a point P in space in cavity C and describing a circle of radius $$\frac{t}{2}$$

about the P as the center, that this point is less than one-half of the maximum body thickness from two or more separate points on the cavity faces 14a and 15a respectively. Also point P is spaced from the three nearest points on the cavity faces 14a and 15a a distance totalling less than the maximum body thickness $t$. In correlating the distance $t$ with the maximum bristle thickness $y$, I find that the ratio "$t:y$" should be about 8–10:1, and preferably 9:1, in the fabrication of brushes having substantially rigid backs supporting the bristles.

It will, of course, be understood that various details of construction and operation may be varied through a wide range without departing from the principles of this invention and it is, therefore, not the purpose of the patent granted hereon otherwise necessitated by the scope of the appended claims.

I claim as my invention:

1. A method of forming an article having a round-tipped slender finger thereon, which comprises filling a suitable mold having a closed finger cavity with plasticated polyethylene material at 300–550° F. and under 300–1000 atmospheres to entrap air in the cavity, the cavity having a diameter of 0.04–0.08 inch and a depth of at least ¼ inch, and rigidifying in situ the material in the mold.

2. A method of forming an article having a round-tipped slender finger thereon, which comprises filling a suitable mold having a closed finger cavity with plasticated polyethylene material at 450–550° F. and under 300–500 atmospheres to entrap air in the cavity, the cavity having a diameter of 0.04–0.08 inch and a depth of at least ¼ inch, and rigidifying in situ the material in the mold.

3. A method of forming a rounded end upon a slender rod-like polyethylene body, that comprises injecting polyethylene material at 450–550° F. and under 300–500 atmospheres into a closed mold cavity having a diameter of at least 0.04 inch and a cross-sectional area of not more than 0.02 square inch and a depth of at least ¼ inch to entrap air in the cavity, and rigidifying in situ the material in the mold.

4. A method of forming a rounded end upon a slender rod-like polyethylene body, that comprises injecting polyethylene material at 450–550° F. and under 300–500 atmospheres into a closed mold cavity of substantially uniform diameter of 0.04 to 0.08 inch and having a depth of at least ¼ inch to entrap air in the cavity, and rigidifying in situ the material in the mold.

5. A method of forming a round end upon a slender rod-like polyethylene body, that comprises injecting polyethylene material at 450–550° F. and under 300–500 atmospheres into a closed mold cavity having a first portion near the cavity mouth of substantially uniform diameter of 0.06–0.1 inch and a depth of ⅛ to ⅜ inch and having a second portion inward from the first and closed at its inner end, the second portion having substantially uniform diameter of 0.08–0.04 inch and a depth of ¼ to ¾ inch, so as to entrap air at the closed inner end of the second cavity portion, and rigidifying in situ the material in the mold.

6. A method of forming an article having a round-tipped slender finger thereon, which comprises filling a suitable mold having a closed finger cavity with plasticized polyethylene material at 300–550° F. and under 300–1000 atmospheres to entrap air in the cavity, the cavity having a first portion near the cavity mouth of substantially uniform diameter of 0.06–0.1 inch and a depth of ⅛ to ⅜ inch and having a second portion inward from the first and closed at its inner end, the second portion having a substantially uniform diameter of 0.04–0.08 inch and a depth of ¼ to ¾ inch, and simultaneously cooling the mold to accelerate rigidification in situ of the material and shrinkage thereof in the mold.

7. A method of forming an article having a round-tipped slender finger thereon, which comprises filling a suitable mold having a closed finger cavity with plasticated polyethylene material at 300–550° F. and under 300–1000 atmospheres to entrap air in the cavity, the cavity having a first portion near the cavity mouth of elements having unvented finger-forming holes of 0.04–0.08 inch diameter and at least ¼ inch depth on the cavity face thereof and having a second cavity therein separate from the mold cavity to accommodate fluid cooling media, means communicating with said second cavity for providing fluid cooling media, a plurality of spaced axially movable sleeve-like knockout pins mounted in said one element, each surrounding one of said finger-forming holes on the cavity face of said one element, and means for moving said pins axially relative to said one element.

17. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof each having a diameter of at least 0.4 inch and a cross-sectional area of not more than 0.02 square inch and a depth of at least ¼ inch.

18. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof each having a terminal portion of substantially uniform diameter of 0.04 to 0.08 inch and having a depth of at least ¼ inch.

19. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof each having a mouth portion of substantially uniform diameter of 0.06–0.1 inch and a depth of ⅛ to ⅜ inch and having a narrower inner portion closed at its inner end having a substantially uniform diameter of 0.08–0.04 inch and a depth of ¼ to ¾ inch.

20. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof, each having a diameter of 0.04–0.08 inch and a depth of at least ¼ inch, and having a second cavity therein separate from the mold cavity to accommodate fluid cooling media, means communicating with said second cavity for providing fluid cooling media, a plurality of spaced axially movable sleeve-like knockout pins mounted in said one element, each surrounding one of said finger-forming holes on the cavity face of said one element, means for moving said pins axially relative to said one element, and ribs positioned on the cavity face of the other of said elements projecting into the body-forming cavity space so that every point in such space is spaced from at least two separate points on the cavity faces a distance less than one-half the maximum body thickness.

21. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said elements having unvented finger-forming holes on the cavity face thereof, each having a diameter of 0.04–0.08 inch and a depth of at least ¼ inch, and having a second cavity therein separate from the mold cavity to accommodate fluid cooling media, means communicating with said second cavity for providing fluid cooling media, a plurality of spaced axially movable sleeve-like knockout pins mounted in said one element, each surrounding one of said finger-forming holes on the cavity face of said one element, means for moving said pins axially relative to said one element, and ribs on the cavity face of the other of said elements presenting convex cavity faces extending into the body-forming cavity space so that every point in such space is spaced from three separate points on the cavity faces a total distance not in excess of the maximum body thickness.

22. A method of forming an article having a round-tipped slender finger thereon using a suitable mold with a finger cavity for forming the article finger, which comprises the steps of filling the mold with liquid polyethylene under at least 300 atmospheres to entrap and compress air in the finger cavity having a diameter of 0.04–0.08 inch and a depth of ¼–¾ inch surrounding the finger tip, and rigidifying in situ the material in the mold.

23. A method of forming an article having a round-tipped slender finger thereon, which comprises filling a suitable mold having a closed finger cavity with plasticated polyethylene material at 500° F. and under 400 atmospheres to entrap air in the cavity, the cavity having a diameter of 0.04 to 0.08 inch and a depth of at least ¼ inch, and rigidifying in situ the material in the mold.

24. A method of forming a round end upon a slender rod-like polyethylene body, that comprises injecting polyethylene material at 500° F. and under 400 atmospheres into a closed mold cavity having a first portion near the cavity mouth of substantially uniform diameter of 0.06–0.1 inch and a depth of ⅛ to ⅜ inch and having a second portion inward from the first and closed at its inner end, the second portion having substantially uniform diameter of 0.08–0.04 inch and a depth substantially uniform diameter of 0.06-0.1 inch and a depth of ⅛ to ⅜ inch and having a second portion inward from the first and closed at its inner end, the second portion having a substantially uniform diameter of 0.04-0.08 inch and a depth of ¼ to ¾ inch, and cooling the mold to below 75° F. to accelerate rigidification in situ of the material and shrinkage thereof in the mold.

8. A method of forming an article having a round-tipped slender finger thereon, which comprises filling a suitable mold having a closed finger cavity with plasticated polyethylene material at 300-550° F. and under 300-1000 atmospheres to entrap air in the cavity, the cavity having a diameter of 0.04 to 0.08 inch and a depth of at least ¼ inch, and retaining the material in the mold until the surface thereof has cooled to at least 130° F., and then removing the material from the mold.

9. A method of forming an article having a round-tipped slender finger thereon, which comprises filling a suitable mold having a closed finger cavity with plasticated polyethylene material at 300-550° F. and under 300-1000 atmospheres to entrap air in the cavity, the cavity having a diameter of 0.04 to 0.08 inch and a depth of at least ¼ inch, simultaneously cooling the mold to 60-70° F. to accelerate rigidification and material shrinkage in the mold, and, as soon as the material surface has cooled to 120-140° F., ejecting the material from the mold.

10. A method of forming an article having a round-tipped slender finger thereon, which comprises filling a suitable mold having a closed finger cavity with plasticated polyethylene material at 300-500° F. and under 300-1000 atmospheres to entrap air in the cavity, the cavity having a diameter of 0.04 to 0.08 inch and a depth of at least ¼ inch, simultaneously cooling the mold to 60-70° F. to accelerate rigidification and material shrinkage in the mold, and, as soon as the material surface has cooled to 120-140° F., ejecting the material from the mold and submerging the ejected material in water at not more than 100° F.

11. A method of forming an article having a round-tipped slender finger thereon, which comprises filling a suitable mold having a closed finger cavity with plasticated polyethylene material at 300-550° F. and under 300-1000 atmospheres to entrap air in the cavity, the cavity having a diameter of 0.04 to 0.08 inch and a depth of at least ¼ inch, simultaneously cooling the mold to 60-70° F. to accelerate rigidification and material shrinkage in the mold, and, as soon as the material surface has cooled to 120-140° F., ejecting the material from the mold and exposing the ejected material to a cooling medium to prevent heat from within the material from increasing the surface temperatures thereof during cooling of the material to room temperature.

12. A method of forming an article having a body and a plurality of spaced round-tipped slender fingers integrally formed on a face thereof and extending therefrom, which comprises providing a suitable closed mold therefor with unvented finger-forming holes in a cavity face of such mold, forcing plasticated polyethylene at 450-550° F. and under 300-500 atmospheres against the cavity face to substantially fill the holes therein while entrapping air in each of the holes said holes each having a first portion near the cavity mouth of substantially uniform diameter of 0.06-0.1 inch and a depth of ⅛ to ⅜ inch and having a second portion inward from the first and closed at its inner end, the second portion having a substantially uniform diameter of 0.04-0.08 inch and a depth of ¼ to ¾ inch, maintaining the mold at 60-70° F. in the region of said cavity face to accelerate cooling of the polyethylene, and, as soon as the polyethylene surface has cooled to 120-140° F., opening the mold and subjecting the polyethylene on said cavity face to pressure at localized spaced points to urge the polyethylene away from said cavity face.

13. An injection molding assembly for molding an integral plastic article having a body and a plurality of spaced slender round-tipped fingers extending from a face thereof, which comprises a plurality of relatively movable mold elements adapted to open and close and to define in closed position a suitable mold cavity for the article, one of such elements having unvented finger-forming holes on the cavity face thereof said holes each having a first portion near the cavity mouth of substantially uniform diameter of 0.06-0.1 inch and a depth of ⅛ to ⅜ inch and having a second portion inward from the first and closed at its inner end, the second portion having a substantially uniform diameter of 0.04-0.08 inch and a depth of ¼ to ¾ inch, and said elements defining air-bleed vents at contiguous faces thereof in closed position in communication with said mold cavity.

14. An injection molding assembly for molding an integral plastic article having a body and a plurality of spaced slender round-tipped fingers extending from a face thereof, which comprises a plurality of relatively movable mold elements adapted to open and close and to define in closed position a suitable mold cavity for the article, one of such elements having unvented finger-forming holes of 0.04-0.08 inch diameter and at least ¼ inch depth, on the cavity face thereof and having means cooperating therewith, separate from the mold cavity for fluid cooling of the cavity and said elements defining air-bleed vents at contiguous faces thereof in closed position in communication with said mold cavity.

15. An injection molding assembly for molding an integral plastic article having a body and a plurality of spaced slender round-tipped fingers extending from a face thereof, which comprises a plurality of relatively movable mold elements adapted to open and close and to define in closed position a suitable mold cavity for the article, one of such elements having unvented finger-forming holes of 0.04-0.08 inch diameter and at least ¼ inch depth on the cavity face thereof, knockout pins mounted in said one element each presenting a cavity face having one of said finger-forming holes therein, and said elements defining air bleed vents at contiguous faces thereof in closed position in communication with said mold cavity.

16. An injection molding assembly for molding an integral plastic article having a body and a plurality of spaced slender round-tipped fingers extending from a face thereof, which comprises a pair of matingly engageable mold elements adapted to define in engaged position a suitable mold cavity for the article, means for selectively engaging and separating said elements, said elements defining restricted air-bleed vents and a restricted gate at contiguous faces thereof in engaged position, one of said of ¼ to ¾ inch, so as to entrap air at the closed inner end of the second cavity portion, and rigidifying in situ the material in the mold.

25. A method of forming an article having a round-tipped slender finger thereon, which comprises filling a suitable mold having a closed finger cavity with plasticated polyethylene material at 500° F. and under 400 atmospheres to entrap air in the cavity, the cavity having a diameter of 0.04–0.08 inch and a depth of at least ¼ inch, simultaneously cooling the mold to 60–70° F. to accelerate rigidification and material shrinkage in the mold, and, as soon as the material surface has cooled to 120–140° F., ejecting the material from the mold and submerging the ejected material in water at not more than 100° F.

26. A method as claimed in claim 1 wherein the cavity has a substantially straight taper the full length thereof.

27. A method as claimed in claim 22 wherein the cavity has a substantially straight taper the full length thereof.

28. An assembly as claimed in claim 14 wherein the finger-forming holes each have a substantially straight taper the full length thereof.

AUSTIN B. SNYDER.

References Cited in the file of this patent
UNITED STATES PATENTS

| Number | Name | Date |
|---|---|---|
| 405,296 | Bailey | June 18, 1889 |
| 1,903,161 | Barkan | Mar. 28, 1933 |
| 2,355,744 | Myers | Aug. 15, 1944 |
| 2,592,296 | Kutik | Apr. 8, 1952 |
| 2,607,064 | Sullivan | Aug. 19, 1952 |